Figures 1, 2:
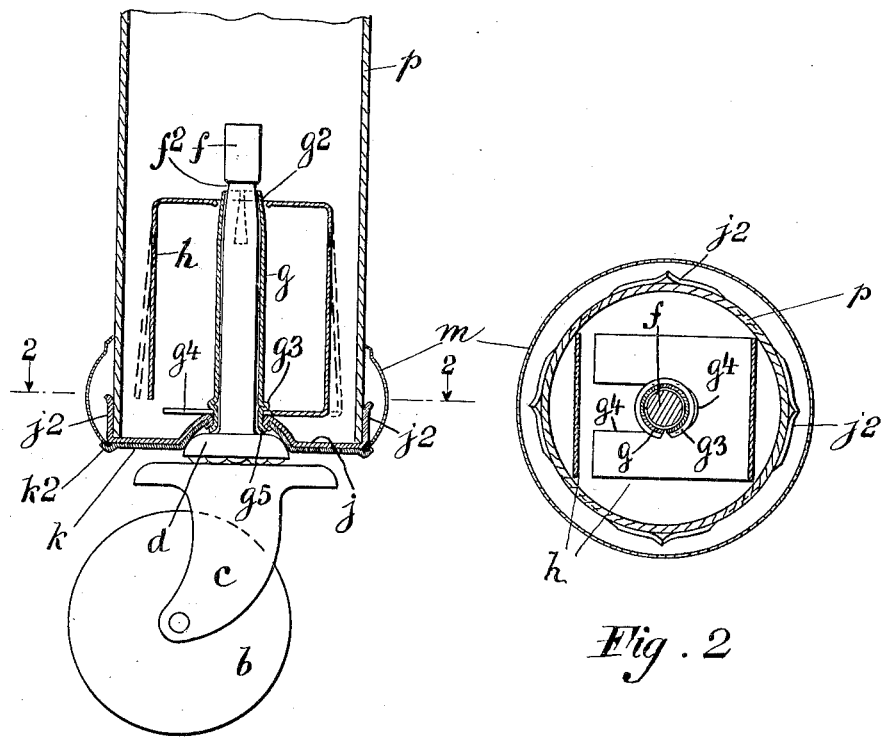

A. B. DISS.
CASTER STRUCTURE FOR TUBULAR LEGS.
APPLICATION FILED APR. 5, 1912.

1,089,627.

Patented Mar. 10, 1914.

UNITED STATES PATENT OFFICE.

ALBERT B. DISS, OF NEWARK, NEW JERSEY, ASSIGNOR TO UNIVERSAL CASTER & FOUNDRY COMPANY, OF NEW YORK, N. Y., A CORPORATION OF NEW JERSEY.

CASTER STRUCTURE FOR TUBULAR LEGS.

1,089,627.  Specification of Letters Patent.  Patented Mar. 10, 1914.

Application filed April 5, 1912. Serial No. 688,627.

*To all whom it may concern:*

Be it known that I, ALBERT B. DISS, a citizen of the United States, and resident of Newark, New Jersey, have invented certain new and useful Improvements in Caster Structures for Tubular Legs, of which the following is a specification, accompanied by drawings.

The invention relates particularly to caster structures which combine with the caster wheel, jaws and pintle a pintle tube, leg supporting plate, leg mount carried by the leg supporting plate and spring means for retaining the leg mount, supporting plate and pintle to the tubular leg. Some features of the invention, it will be seen, are capable of a somewhat broader application.

The object of the invention in its most preferred and complete form is to enable a light and ornamental leg mount of spun brass or other suitable material to be secured to the leg supporting plate and to surround and approximately fit the exterior of the leg, and yet to relieve such leg mount of undue stresses and strains due to the action of the pintle in adjusting and centering itself relatively to the leg; also to simplify and improve the manner of attachment of the pintle tube to the leg supporting plate and spring retaining device, and to improve the construction and coöperation of the pintle tube, leg supporting plate and spring retaining device, as will be more fully understood from the following description.

In the accompanying drawings, Figure 1 is a vertical central section of a caster structure embodying the present invention, the caster wheel jaws and pintle being shown in full elevation and the leg in section, Fig. 2 is a cross section of the same on the plane 2—2 of Fig. 1.

The caster wheel $b$, jaws $c$, ball bearing $d$ and pintle $f$ are of any appropriate construction, the pintle having a reduced neck $f^2$ for securing it to the pintle tube. The pintle tube $g$ is preferably economically made of a rolled up piece of sheet metal and is bifurcated at its upper end, as shown by dotted lines in Fig. 1, and sprung inward so as to form two spring ends $g^2$ for embracing the reduced neck of the pintle and preventing the accidental withdrawal of the pintle head. At the lower end the pintle tube is upset or crimped to form two collars, between which are loosely secured the lower end of the spring frame $h$ and the two leg supporting plates $j$, $k$. The pintle tube is free to rock, so far as this joint is concerned, relative to the leg supporting plates, and, consequently, relative to the leg mount $m$.

The lower plate $k$ has a step or shouldered flange $k^2$ around its periphery which receives and fits the leg mount $m$, as shown, and between which and the upper plate $j$ the leg mount is securely held. Near the center, both leg supporting plates are dished or domed upward to rest on the cover of the ball bearings and allowed clearance for the end flange $g^5$ of the pintle tube $g$ where it protrudes beneath the plates. The upper leg supporting plate $j$ is secured closely against the lower plate by turning its inner edge where it surrounds the pintle tube downward and locking it under the lower plate $k$, as shown. The upper plate $j$ is made of a square plate with the corners upturned and fitted to receive and embrace the lower end of the leg $p$ on four sides, as at $j^2$. These corner portions overlie the lower edge of the leg mount $m$ and secure it against the lower plate $k$.

The spring frame $h$ combines an upper centering device for the pintle tube $g$ and a spring device for holding the tube, leg mount and plates to the leg. It consists of a straight, flat blank of metal, folded as shown in Fig. 1, slotted at its lower end as in Fig. 2 and perforated at its upper end so as to fit around the pintle tube with sufficient play to allow the spring action of the ends $g^2$. The upper horizontal perforated member of the spring frame approximately fits the interior of the leg and, therefore, extending horizontally, it approximately centers the upper ends of the pintle tube and pintle relative to the interior of the leg. The side portions of the frame, when out of the leg and unrestrained, spring outward to the position shown in the dotted lines in Fig. 1, and they, therefore, serve to frictionally secure the frame and connected parts to the leg. The slot $g^4$ in the lower member of the frame $h$ is of width to be confined beneath the flange or collar $g^3$ of the pintle tube and the leg supporting plate. It will be seen that the slot $g^4$ in the lower end of the frame is openended. Consequently, in assembling the parts, the pintle tube may be finished excepting its lower flange or enlargement $g^5$, and it may then be inserted in the perforation in the upper end of the spring frame and passed sidewise into the open end of the slot $g^4$. Then the leg supporting plates and leg mount, having been previously put together, can be strung on to the end of the pintle tube, and the flange or enlargement $g^5$ subsequently upset or formed.

It will be seen that in operation, although the spring frame approximately fits the interior of the leg, some slight inclination and tilting of the pintle relative to the leg will occur in using the caster. The upper end of the pintle is centered by the horizontal portion of the spring frame. The lower end of the pintle is centered by means of the perforation in the leg supporting plates and the upturned corners $j^2$ which center the plates upon the leg. The slight tilting movement of the pintle brings no tilting strain upon the leg mount or supporting plates, and the horizontal thrust of the pintle upon the leg supporting plates is largely, and may be entirely, if desired, sustained by the upturned corners $j^2$, instead of by the leg mount. At the upper end of the tube, it will be seen that the spring ends $g^2$, loosely fitting the perforation in the spring frame, are able to sustain the pintle without danger of injury or deformation. In withdrawing or inserting the caster pintle the spring ends $g^2$ of the pintle tube yield within the surrounding perforation sufficiently to allow the end of the pintle to pass them.

The structure as a whole allows each one of the parts to perform its alloted function in coöperative relation to the others in a highly efficient manner with the least unnecessary strains. The particular design of the respective parts can be widely varied without departing from the principle of operation, however, the minor details of construction shown being merely exemplary.

What I claim is:

1. A caster structure for tubular legs, combining a pintle tube, a leg supporting plate centered on the pintle tube, and a spring frame centered on the pintle tube near the upper end of the tube and extending downward therefrom and adapted to resiliently act outward on the interior of the leg, the said pintle tube, supporting plate and frame being secured together adjacent to the lower end of the tube but the tube and frame being free to tilt relatively to the plate and the frame free to move relatively to both in its resilient action on the interior of the leg.

2. A caster structure for tubular legs, combining a pintle tube having two enlargements near its lower end, a leg supporting plate provided with means for centering it relatively to the leg and secured to and centering the pintle tube between the said two enlargements, and a spring frame having an upper member perforated and surrounding the tube for centering the tube at its upper end in the leg, said frame having two outwardly acting members for engaging the interior of the leg and which extend downward from said upper perforated member, one of the said downward extending members having a lower portion engaging the pintle tube and confined beneath the upper of the said two enlargements but left free to move in directions to permit the inward and outward action of the spring frame.

3. Caster structure combining a leg supporting plate, a pintle tube extending through the plate and secured thereto by enlargements below and above the same, and a spring frame having a perforate portion which surrounds the upper end of the tube and a lower portion which is provided with an open-ended slot which fits between the said enlargements.

In testimony whereof I have signed this specification in the presence of two subscribing witnesses this 2nd day of April, 1912.

ALBERT B. DISS.

Witnesses:
FRANCIS A. STANTON,
AUGUSTA PSCHIERER.